United States Patent [19]
Harmon et al.

[11] Patent Number: 5,992,038
[45] Date of Patent: Nov. 30, 1999

[54] MEASUREMENT MARKER

[76] Inventors: Lary Harmon, 4806 W. Ave M-14, Quartz Hill, Calif. 93536; Tony Gryder, 37311 47th St. East, Space 176, Palmdale, Calif. 93552

[21] Appl. No.: 08/958,422

[22] Filed: Oct. 27, 1997

[51] Int. Cl.⁶ .................................................. G01B 3/10
[52] U.S. Cl. ................................................. 33/768; 33/668
[58] Field of Search ........................... 33/668, 759, 760, 33/761, 768, 769, 770

[56] References Cited

U.S. PATENT DOCUMENTS

| | | | |
|---|---|---|---|
| 3,336,678 | 8/1967 | Chamberlain et al. | 33/761 |
| 3,802,083 | 4/1974 | Freed | 33/668 |
| 4,015,337 | 4/1977 | Taylor | 33/668 |
| 4,760,648 | 8/1988 | Doak et al. | 33/761 |
| 5,154,006 | 10/1992 | Wooster | 33/668 |
| 5,172,486 | 12/1992 | Waldherr | 33/668 |
| 5,295,308 | 3/1994 | Stevens et al. | 33/768 |
| 5,477,619 | 12/1995 | Kearns | 33/768 |

*Primary Examiner*—G. Bradley Bennett
*Attorney, Agent, or Firm*—Dennis W. Beech

[57] ABSTRACT

The measurement marker has a protruding arm when attached to the carrier of a measuring instrument such as a tape measure. The protruding arm holds a marker such as a pen, pencil or cutting blade in position such that the user may mark the distance measured once the tape measure has been extended for measurement. The measurement marker may be attached to existing tape measures using the carrier case assembly screws or may be integrated into the tape measure carrier design.

10 Claims, 3 Drawing Sheets

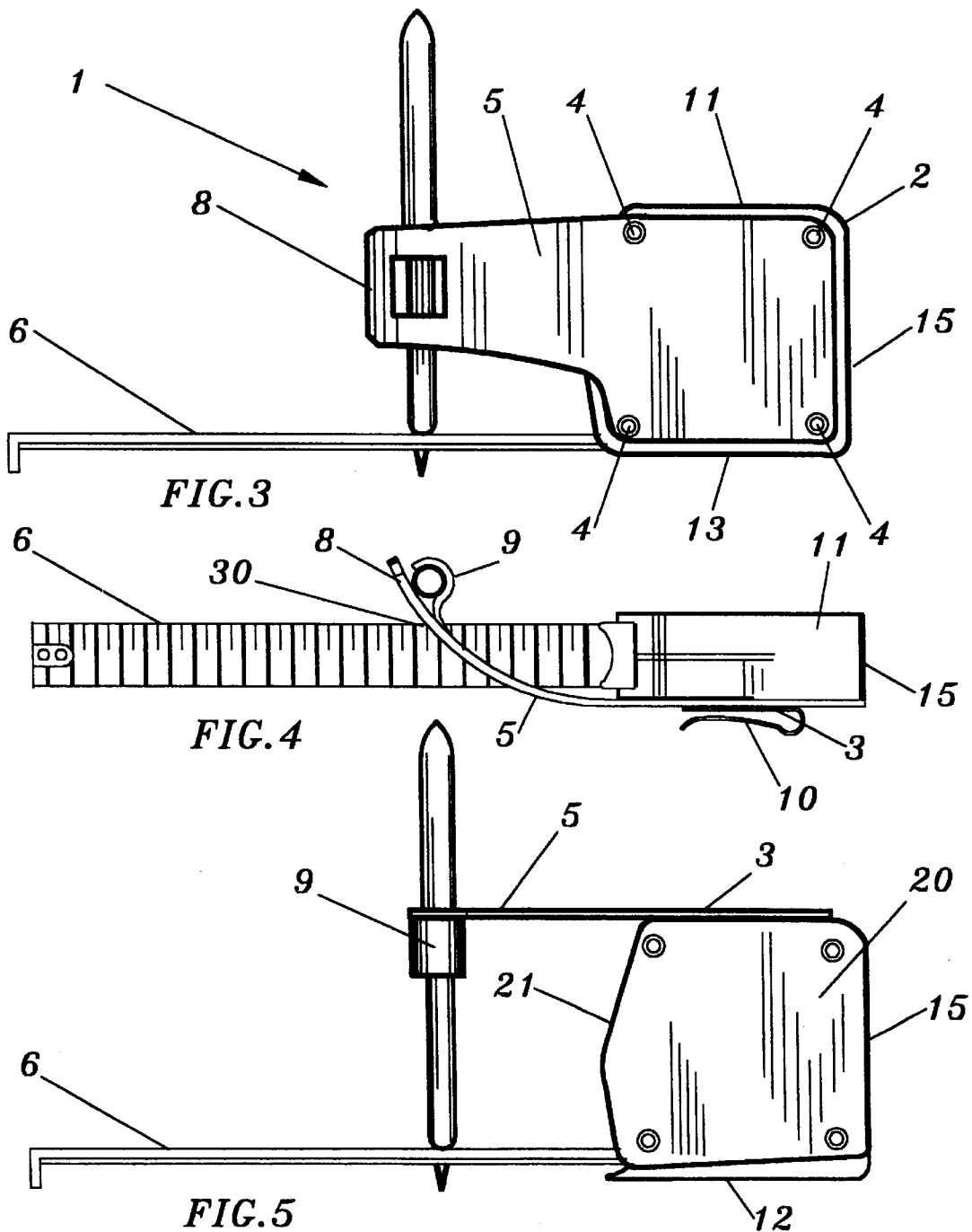

MEASUREMENT MARKER

BACKGROUND OF THE INVENTION

1. Field of the Invention

This invention relates to devices used to measure and then mark the distance measured. The new device provides a simple means for the user to hold both ends of the measuring instrument with the hands and to mark or cut at the measured distance with an attached marker or cutting device.

2. Description of Related Art

There are currently in use various methods of marking or cutting at a measured distance. For persons making drawings the marking pencil or pen is held in one hand by the user. In construction work were a person must move to a location to measure and mark distance, the marking device must be carried on the person and retrieved when needed to make a mark. When the distance to be marked is known in advance this marking is sometimes done by the use of a line with the marker tied to the end of the line.

Having to retrieve the marker when measuring a distance can become difficult if not dangerous when the user is on a ladder or in a position where a hand must be used to hold each end of the measuring device, such as, when using a retractable tape measure. The present invention provides for the marking device to be attached to the tape measure carrier such that it is always in position near one hand for use in making a mark or cut at the measured distance.

SUMMARY OF THE INVENTION

One object of the present invention is to enable the user of a measuring instrument ease of access to a marking or cutting device at the distance measured. Another object is modification of existing measuring instrument to hold a marking or cutting device.

In accordance with the description presented herein, other objectives of this invention will become apparent when the description and drawings are reviewed.

BRIEF DESCRIPTION OF THE DRAWING

FIG. 3 illustrates a side elevation view of the measurement marker attached to the side of a tape measure carrier.

FIG. 4 illustrates a top view of the measurement marker.

FIG. 5 illustrates a side view of a tape measure carrier with the measurement marker attached to the top.

DESCRIPTION OF THE PREFERRED EMBODIMENT

Figure 1:
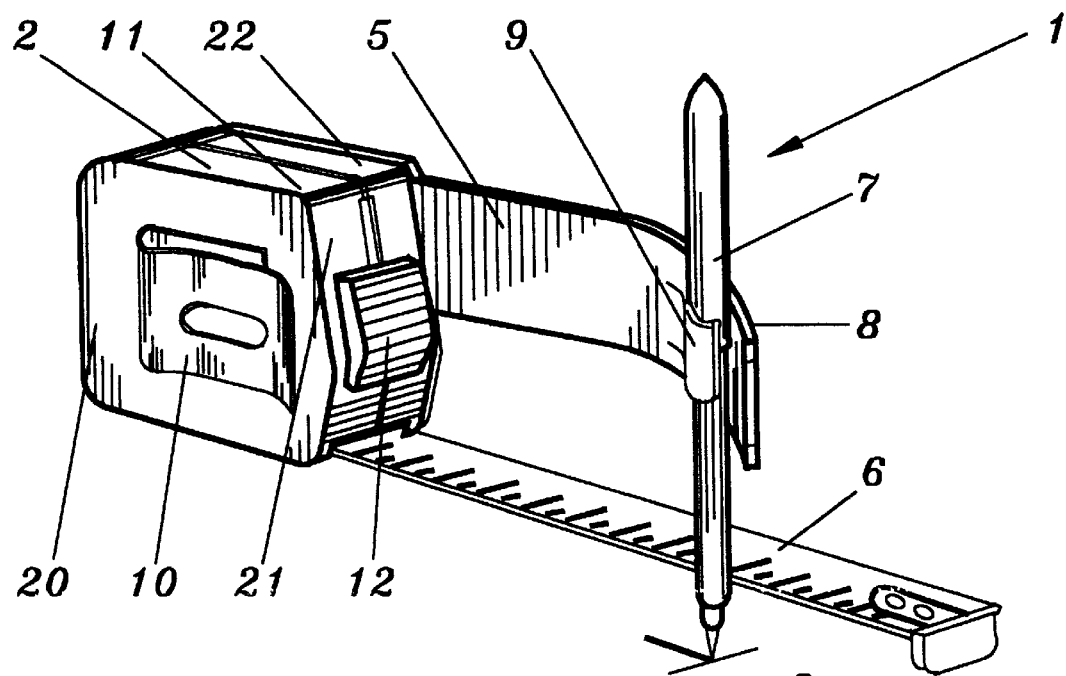
FIG. 1 illustrates a perspective view of the measurement marker attached to a tape measure.

The measurement marker consists of an extended arm attached to the carrier of a tape measuring device with a means to attach a marking or cutting device. The measurement marker may be formed as part of the original carrier or it may be attached as a modification to existing tape measure carriers.

Referring to FIGS. 1 through 4, the measurement marker (1) is a thin, relative to the tape measure carrier (2), sheet of material, such as, metal, plastic and the like, attached to the carrier (2). The attachment end (3) is shaped for purpose of use of the four screws (4) commonly found on a side (20) of carriers (2) to allow attachment by use of existing attachment locations. Tape measure carriers generally are enclosures having two opposing sides (20), a forward end (21), a back end (15), a top (22) and a bottom (15). In this embodiment the arm (5) is curved to pass over the tape (6) for positioning above the opposite edge (30) relative to the attachment end (3) mounting location. However, the arm (5) could also be formed as a straight piece which would locate the marker (7) on the opposite side of the tape (6) as shown in the figures. The marker (7) is held at the arm end (8) by a clip (9) formed from the arm (5) sheet material.

Figure 2:
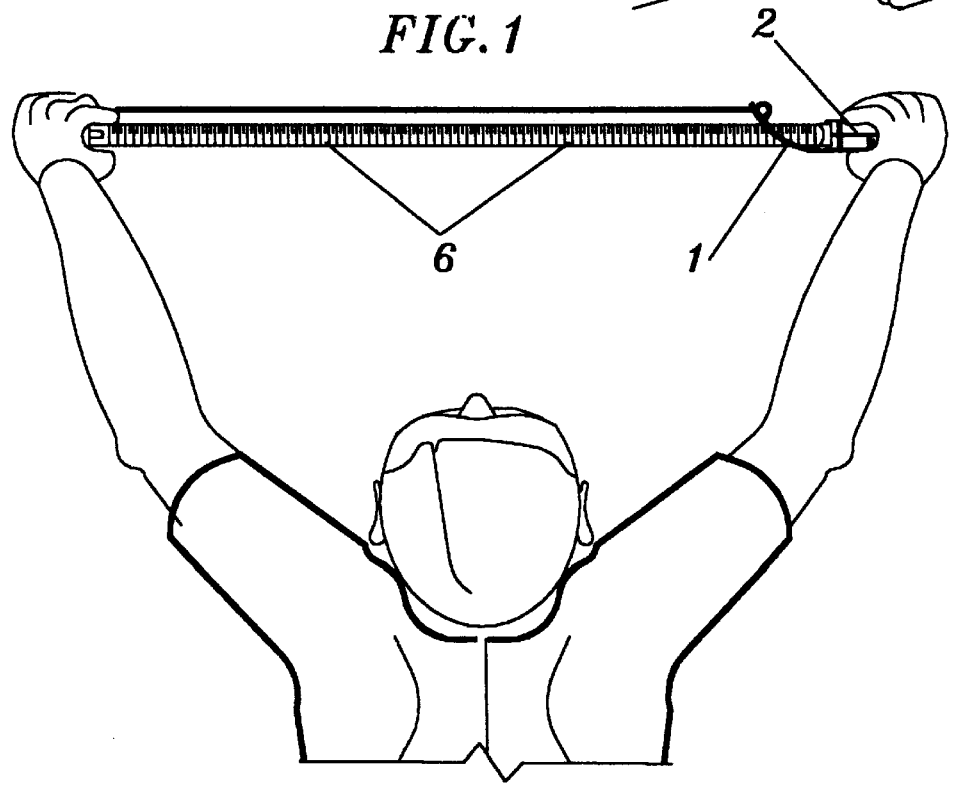
FIG. 2 illustrates the measurement marker used to draw a line.

As can be seen in FIG. 1, a strike mark may be made at the distance measured by a slight movement of the tape measure carrier (2). Also if the arm (5) is formed of a flexible material the arm (5) itself could be moved by the pressure of the users finger. FIG. 2 illustrates the use of the measurement marker (1) to draw a line as the tape (6) is extended.

In FIG. 1, the carrier holding clip (10) has been rotated 90 degrees from that normally found on tape measure carriers (2). This allows for the arm (5) to hang vertically when the carrier (2) is clipped to the users belt or pocket.

Referring to FIG. 5 an alternate embodiment is illustrated wherein the measurement marker (1) has been attached to the top (11) of the carrier (2). In this case the tape (6) locking mechanism (12) is located on the bottom (13) of the carrier (2).

Figure 6:
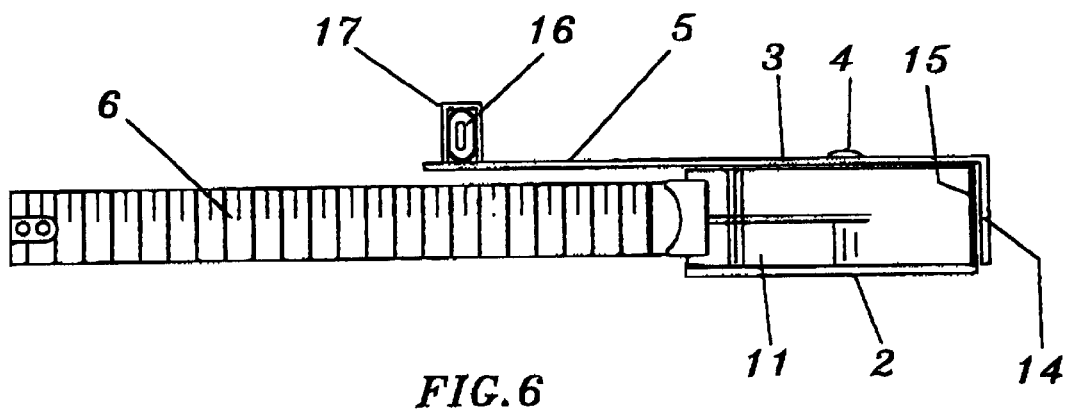
FIG. 6 illustrates a top view of the measurement marker attached to a tape measurer carrier with one screw and a angular protrusion.

Further referring to FIG. 6, an embodiment is illustrated wherein only one attachment location is used on the carrier (2) side with one screw (4) location. In this instance the attachment end (3) has an angular bend at one end to form an angular protrusion (14) which fits around the back (15) of the carrier (2) to stabilize the attachment. The arm (5) has a cutting knife (16) attached by a clamp (17). It can also be understood that if the angular protrusion (14) is removed the measurement marker (1) may be rotated about the screw (4). This provides for a retractable embodiment of the measurement marker (1). Obviously other forms of attachment to the carrier would allow rotation, sliding and the like of the measurement marker (1) relative to the carrier (2).

Figure 7:
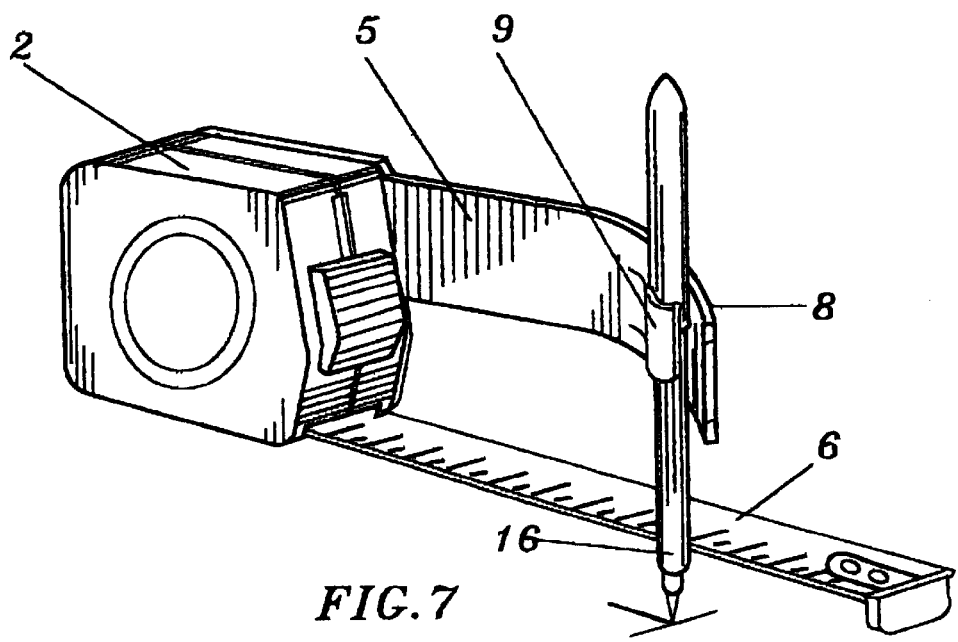
FIG. 7 illustrates a perspective view of a cutting knife use of the measurement marker.

Other shapes and attachment locations may be used based on the construction of the tape measure carrier (2). As illustrated in FIG. 7 other forms of markers (7) may be attached to the arm (5). As illustrated, a cutting knife (16) has been attached. Such devices may be more desirable when working with wall board for cutting, with glass where scoring is desired or with other applications where the action to be taken at the measured distance dictates a particular marking or cutting means. A further example would be the measuring and cutting of fabric, carpeting and the like. The type of attachment for the marker (7) or cutting device depends on the application, but can be clips, clamps, brackets, screws and the like.

I claim:

1. A device for attachment to measuring instruments comprising:

a measurement marker having an attachment end for attachment to a side of a carrier of a measurement instrument;

an arm of the measurement marker protruding generally longitudinally along the direction of a measurement instrument measuring means and curved to extend over the measurement instrument measuring means to position an arm end above the measurement instrument measuring means opposite edge from the side of the carrier to which the attachment end is attached; and the arm end having a means for attachment of a marker.

2. The device as in claim 1 wherein the measurement instrument is a tape measure and the measurement marker is attached to the carrier using an existing plurality of attachment screw locations.

3. The device as in claim 1 wherein the measurement instrument is a tape measure and the measurement marker is attached to the carrier using an existing screw location and an angular protrusion of the attachment end.

4. The device as in claim 1 wherein the measurement instrument is a tape measure and the measurement marker is formed integrally with the carrier.

5. The device as in claim 1 wherein the measurement instrument is a tape measure and the measurement marker is rotatably attached to the carrier.

6. The device as in claim 1 wherein the marker is a pencil.

7. The device as in claim 1 wherein the marker is a pen.

8. The device as in claim 1 wherein the marker is a cutting knife.

9. The device as in claim 1 wherein the means for attachment of a marker is a clip.

10. The device as in claim 1 wherein a holding clip attached to the carrier is oriented to allow the arm to hang vertically when the carrier is attached to a user's belt.

\* \* \* \* \*